United States Patent
Dugue et al.

(10) Patent No.: US 9,203,733 B2
(45) Date of Patent: Dec. 1, 2015

(54) METHOD OF PSEUDO-DYNAMIC ROUTING IN A CLUSTER COMPRISING STATIC COMMUNICATION LINKS AND COMPUTER PROGRAM IMPLEMENTING THAT METHOD

(75) Inventors: Sebastien Dugue, Saint Theoffrey (FR); Jean-Vincent Ficet, La Chapelle Blanche (FR); Yann Kalemkarian, Grenoble (FR); Nicolas Morey-Chaisemartin, Saint-Martin d'Heres (FR)

(73) Assignee: BULL SAS, Les Clayes Sous Bois (FR)

( * ) Notice: Subject to any disclaimer, the term of this patent is extended or adjusted under 35 U.S.C. 154(b) by 76 days.

(21) Appl. No.: 13/701,452

(22) PCT Filed: May 25, 2011

(86) PCT No.: PCT/FR2011/051185
§ 371 (c)(1),
(2), (4) Date: Nov. 30, 2012

(87) PCT Pub. No.: WO2011/151569
PCT Pub. Date: Dec. 8, 2011

(65) Prior Publication Data
US 2013/0070647 A1    Mar. 21, 2013

(30) Foreign Application Priority Data

Jun. 1, 2010 (FR) ..................................... 10 02294

(51) Int. Cl.
*H04L 12/701* (2013.01)
*H04L 12/721* (2013.01)
*H04L 12/729* (2013.01)

(52) U.S. Cl.
CPC .............. *H04L 45/00* (2013.01); *H04L 45/123* (2013.01); *H04L 45/125* (2013.01)

(58) Field of Classification Search
CPC ....... H04L 47/70; H04L 43/08; G06F 15/173; G06F 17/5077
See application file for complete search history.

(56) References Cited

U.S. PATENT DOCUMENTS

2003/0028670 A1 *  2/2003  Lee et al. ...................... 709/241
2008/0256079 A1    10/2008  Saha et al.

OTHER PUBLICATIONS

International Search Report for PCT Application No. PCT/FR2011/051185, mailed Aug. 9, 2011.
Izmailov et al., Administrative Weight Allocation for PNNI Routing Algorithms, High Performance Switching and Routing, May 29, 2001, pp. 347-352, 2001 IEEE Workshop, Piscataway, NJ.

* cited by examiner

*Primary Examiner* — Fan Ng
(74) *Attorney, Agent, or Firm* — Pillsbury Winthrop Shaw Pittman LLP

(57) ABSTRACT

The invention relates to the pseudo-dynamic routing in a cluster comprising nodes, of the static communication links connecting these nodes. The routing is based on load levels associated with the links. After having received (635) a list of node identifiers, these identifiers designating a set of nodes allotted to the execution of a task, a weight having a first predetermined value is assigned (655) to a pair formed of an identifier of a first and of a second node of said set of nodes, the first and second nodes being distinct, a weight having a second predetermined value, distinct from the first value, being assigned by default to the formed pairs of identifiers of nodes allotted to different tasks. The cluster is then routed, the routing comprising the selecting (610) of a route between the first and second nodes and the incrementing (625) of a load level associated with each link comprising the selected route of the first value.

10 Claims, 6 Drawing Sheets

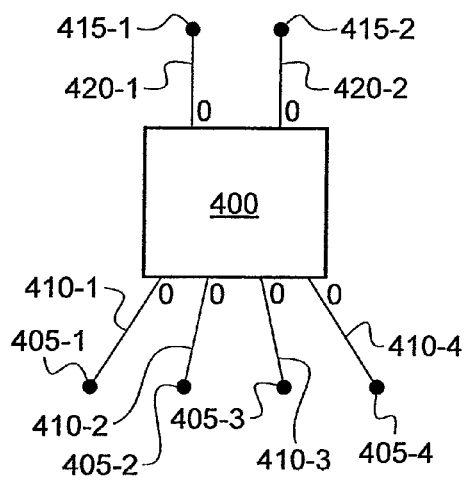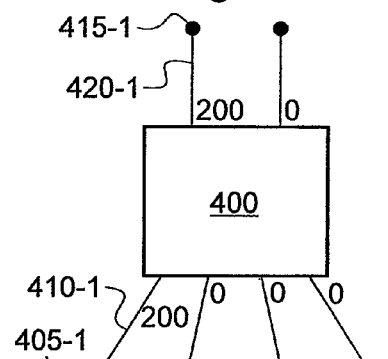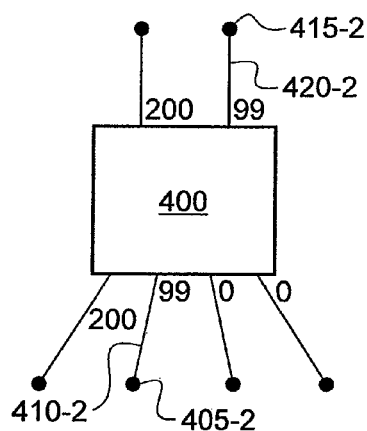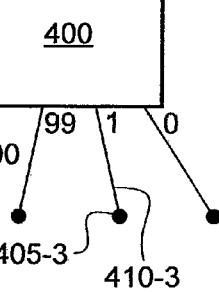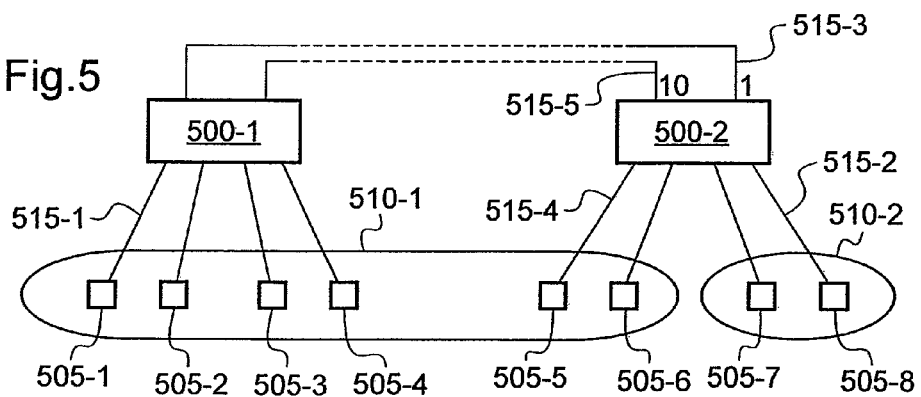

METHOD OF PSEUDO-DYNAMIC ROUTING IN A CLUSTER COMPRISING STATIC COMMUNICATION LINKS AND COMPUTER PROGRAM IMPLEMENTING THAT METHOD

CROSS REFERENCE TO RELATED APPLICATION

This application is a U.S. National Phase under 35 U.S.C. §371 of International Application PCT/FR2011/051185, filed May 25, 2011, which designated the U.S., and which claims priority under 35 U.S.C. §119 to France Patent Application Number 1002294, filed Jun. 1, 2010. The disclosures of the above-described applications are hereby expressly incorporated by reference in their entireties.

BACKGROUND

1. Field of the Invention

The present invention concerns the routing in a cluster, that is to say the determination of communication routes between a set of nodes of the cluster, and more particularly a method of pseudo-dynamic routing in a cluster comprising static communication links and a computer program implementing that method.

2. Description of Related Technology

High Performance Computing (HPC) is being developed for university research and industry alike, in particular in technical fields such as aeronautics, energy, climatology and life sciences. Modeling and simulation make it possible in particular to reduce development costs and to accelerate the placing on the market of innovative products that are more reliable and consume less energy. For research workers, high performance computing has become an indispensable means of investigation.

This computing is generally conducted on data processing systems called clusters. A cluster typically comprises a set of interconnected nodes. Certain nodes are used to perform computing tasks (compute nodes), others for storing data (storage nodes) and one or more others manage the cluster (administration nodes). Each node is for example a server implementing an operating system such as Linux (Linux is a trademark). The connection between the nodes is, for example, made using Ethernet or Infiniband communication links (Ethernet and Infiniband are trademarks).

FIG. 1 is a diagrammatic illustration of an example of a topology 100 for a cluster, of fat-tree type. The latter comprises a set of nodes of general reference 105. The nodes belonging to the set 110 are compute nodes here whereas the nodes of the set 115 are service nodes (storage nodes and administration nodes). The compute nodes may be grouped together in sub-sets 120 called compute islands, the set 115 being called a service island.

The nodes are linked together by switches, for example hierarchically. In the example illustrated in FIG. 1, the nodes are connected to first level switches 125 which are themselves linked to second level switches 130 which in turn are linked to third level switches 135.

As illustrated in FIG. 2, each node generally comprises one or more microprocessors, local memories and a communication interface. More specifically, the node 200 here comprises a communication bus 202 to which there are connected

- central processing units (CPUs) or microprocessors 204;
- components of random access memory (RAM) 206, comprising registers adapted to record variables and parameters created and modified during the execution of programs (as illustrated, each random access memory component may be associated with a microprocessor); and,
- communication interfaces 208 adapted to send and to receive data.

The node 200 furthermore possesses here internal storage means 212, such as hard disks, able in particular to contain the executable code of programs.

The communication bus allows communication and interoperability between the different elements included in the node 200 or connected to it. The microprocessors 204 control and direct the execution of the instructions of portions of software code of the program or programs. On powering up, the program or programs which are stored in a non-volatile memory, for example a hard disk, are transferred into the random access memory 206.

It is observed here that the performance of a cluster is directly linked to the quality of the routes enabling the transfer of data between the nodes, that are established via communication links. In general terms, physical communication links are established between the nodes and the switches at the time of the hardware configuration of a cluster, the communication routes themselves being determined in an initialization phase on the basis of a definition of the connections to be established between the nodes. According to the communication technology implemented, the configuration of the routes may be static or dynamic.

By way of illustration, the Infiniband technology enables, in a cluster, a static configuration of the routes. This configuration uses static routing tables, known as Linear Forwarding Tables (LFTs), in each switch. When this technology is implemented, a routing algorithm such as the algorithms known under the names FTree, MINHOP, UPDN and LASH may be used.

In simplified manner, the FTree algorithm determines routes such that they are distributed as much as possible through existing communication links. For these purposes, at the time of the routing of a communication network fully connected in accordance with a fat-tree type architecture, each node of the network is considered as having the same importance. Thus, when a route is established between two nodes of the same link, the number of routes using that link, called the load of the link, is increased by one. When the routing algorithm seeks to establish a new route and there are several possibilities, it compares the load levels associated with the links on which those possibilities are based and chooses the one whose links have the lowest load level.

The routing quality may be expressed in terms of the number of routes per link.

FIG. 3, comprising FIGS. 3a to 3e, illustrates this routing principle in a switch 300 at the time of an initialization phase of a cluster comprising that switch.

The switch 300 here has four input communication links, denoted 310-1 to 310-4, linking the switch 300 to inputs 305-1 to 305-4 and two output communication links, denoted 320-1 and 320-2, linking the switch 300 to outputs 315-1 and 315-2. Prior to initialization, none of the links 310-1 to 310-4, 320-1 and 320-2 comprises any route. The load levels associated with those links are thus zero as illustrated in FIG. 3a beside each link. Then, when a route is to be established between the input 305-1 and an output of the switch 300, the link 310-1 (the only one able to be used) is selected as well as the link 320-1 (as the load levels associated with the links 320-1 and 320-2 are, here, equal to zero, the first link is selected). The load levels associated with the links 310-1 and 320-1 are then incremented by one to indicate that those links are implementing an additional route, as illustrated in FIG. 3b.

In the same way, when a route is to be established between the input 305-2 and an output of the switch 300, the link 310-2 (the only one able to be used) is selected as well as the link 320-2 (as the load level associated with the link 320-1 is equal to one and the load level associated with the link 320-2 is equal to zero, the latter link is selected). The load levels associated with the links 310-2 and 320-2 are then incremented by one to indicate that those links are implementing an additional route, as illustrated in FIG. 3c. In similar manner, when a route is to be established between the input 305-3 and an output of the switch 300, the link 310-3 (the only one able to be used) is selected as well as the link 320-1 (as the load levels associated with the links 320-1 and 320-2 are equal, the first link is selected). The load levels associated with the links 310-3 and 320-1 are then incremented by one to indicate that those links are implementing an additional route, as illustrated in FIG. 3d.

Lastly, when a route is to be established between the input 305-4 and an output of the switch 300, the link 310-4 (the only one able to be used) is selected as well as the link 320-2 (as the load level associated with the link 320-1 is equal to two and the load level associated with the link 320-2 is equal to one, the latter link is selected). The load levels associated with the links 310-4 and 320-2 are then incremented by one to indicate that those links are implementing an additional route, as illustrated in FIG. 3e. When all the routes between the nodes have been established, the static routing tables for the switches are updated.

However, although these routing algorithms give good results, they are not optimal.

SUMMARY OF CERTAIN INVENTIVE ASPECTS

The invention enables at least one of the problems set forth above to be solved.

One inventive aspect relates to a computer method for pseudo-dynamic routing in a cluster comprising a plurality of nodes, static communication links linking nodes of the plurality of nodes, the routing being based on load levels associated with the communication links, the method comprising the following steps, receiving a list of node identifiers of the plurality of nodes, the identifiers designating a set of nodes allocated to the execution of a task;

assigning a weight having a first predetermined value to a pair formed by an identifier of a first node of the set of nodes and by an identifier of a second node of the set of nodes, the first and second nodes being distinct, a weight having a second predetermined value, distinct from the first value, being assigned by default to the pairs formed of identifiers of nodes allocated to different tasks; and, routing the cluster, the routing comprising selecting a route between the first and second nodes and incrementing by the first value a load level associated with each communication link comprising the selected route.

In some aspects it is possible to optimize the routing of a cluster by associating weights with routes in order to favor or disfavor certain routes relative to others according to tasks to be executed by nodes of the cluster.

Advantageously, the method may further comprise a step of establishing a match between the identifier of the first node and an output address of the first node and between the identifier of the second node and an input address of the second node, the step of assigning a weight being directed to assigning a weight to a pair formed of the output address of the first node and the input address of the second node.

In some aspects, the method according to the invention may thus be implemented easily on the basis of configuration files for clusters associating input and output addresses for nodes with node identifiers and associating tasks with nodes.

According to a particular embodiment, the method may further comprise a step of comparing an item of information characteristic of the task with a predetermined item of data, the routing step being executed in response to the comparing step.

In some aspects, the method according to the invention thus makes it possible to optimize the routing of a cluster according to characteristics of executed tasks. The item of information characteristic of the task is, for example, the number of nodes allocated to the execution of the task.

Still according to a particular embodiment, the method may further comprise the following steps, identifying at least two nodes of the cluster, a connection having to be established between the at least two identified nodes;

determining at least one route connecting the at least two identified nodes according to the communication links, the at least one route being determined according to the at least two identified nodes, a plurality of communication links of the communication links and at least one load level associated with each communication link of the plurality of communication links, and selecting a determined route;

estimating a weight value associated with the selected route; and incrementing a load level associated with each communication link comprising the selected route according to the estimated weight.

In some aspects, the method according to the invention thus makes it possible to optimize the routing of a cluster according to the allocation of nodes to tasks and according to characteristics of the cluster and of the nodes implemented.

The method may further comprise a step of obtaining a type of node for at least one of the at least two identified nodes, the estimated value of the weight being at least partially estimated according to the obtained type of node. The method according to the invention thus makes it possible to optimize the routing of a cluster according to types of nodes.

Advantageously, the method may further comprise a step of obtaining a reference of a group to which belongs at least one of the at least two identified nodes, the estimated value of the weight being at least partially estimated according to the group reference obtained. The method according to the invention thus makes it possible to optimize the routing of a cluster according to types of nodes without it being necessary to individually characterize each node. A type and/or a group of nodes is, preferably, determined according to the nature of the corresponding nodes.

Still according to a particular embodiment, the method further comprises a step of updating at least one static routing table, the at least one static routing table being associated with at least one switch of the cluster, the at least one switch linking at least at least two nodes of the cluster. The method according to the invention may thus be implemented easily, in particular in conventional architectures using switches provided with static routing tables.

Routes may be advantageously selected in order of the value of the weight associated with them in order to simplify the routing, the routes associated with low weights being easier to define than the routes associated with higher weights.

Inventive aspects also relate to a computer program comprising instructions adapted for the implementation of each of the steps of the method described earlier when the program is executed on a computer. The advantages procured by that computer program are similar to those referred to above.

BRIEF DESCRIPTION OF THE DRAWINGS

The following detailed description, given by way of non-limiting example, relative to the accompanying drawings in which:

FIG. 3, comprising

FIG. 4, comprising FIGS. 4a to 4d, illustrates an example of the principle of routing with weights, in a switch, at the time of an initialization phase of a cluster comprising that switch;

FIG. 5 illustrates an example of topology for a part of a cluster in which the computation of weights of routes connecting nodes according to executed tasks, in accordance with the invention, enables the routing to be optimized; and, FIG. 6, comprising

DETAILED DESCRIPTION OF CERTAIN INVENTIVE EMBODIMENTS

Figure 1:
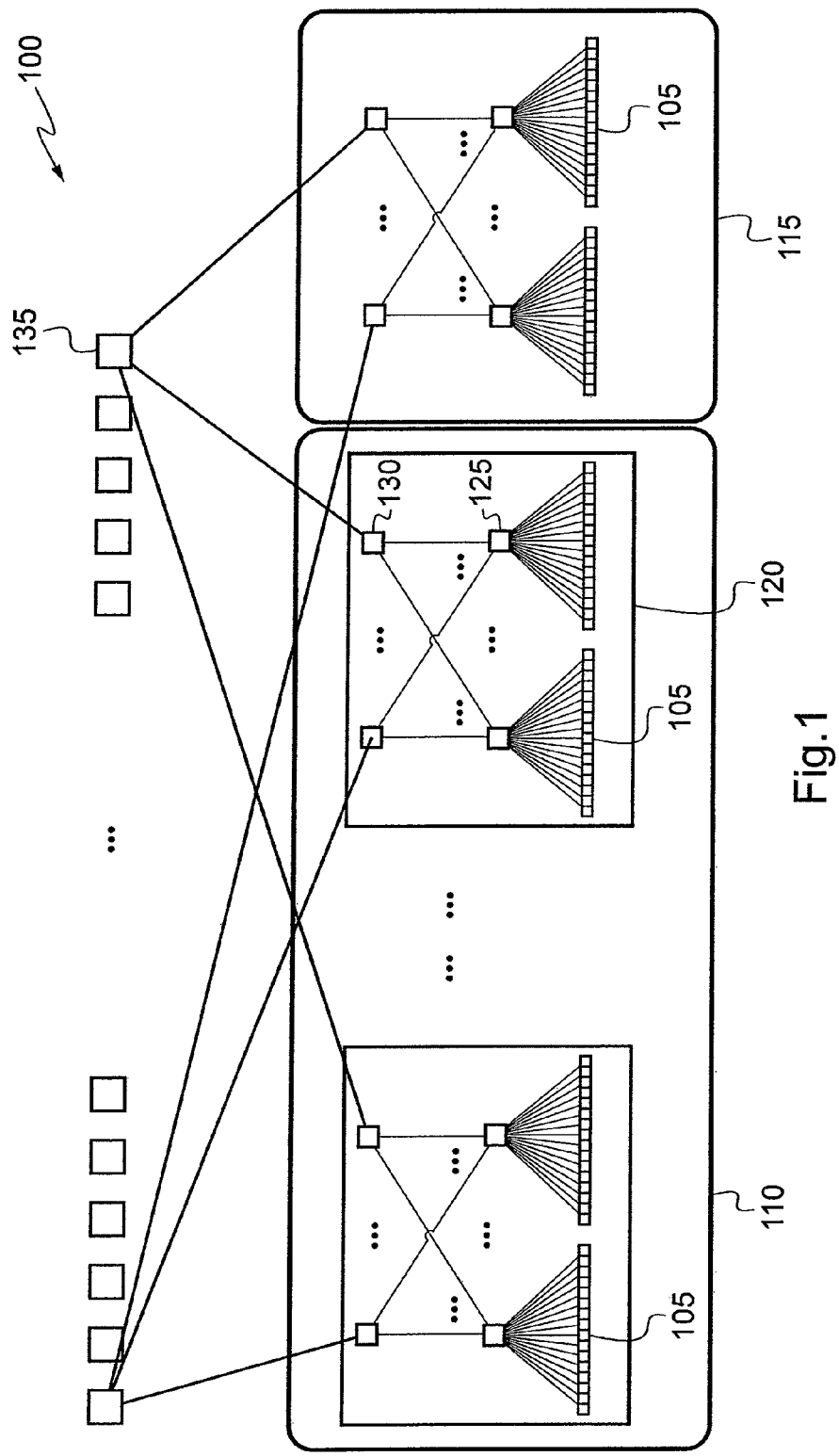
FIG. 1 illustrates an example of topology for a cluster.

It has been observed that if the routes of a communication network in a cluster are of the same nature, the nature of the nodes linked by those routes plays a role with regard to the volume of data exchanged and thus with regard to the bandwidth used. Thus, for example, a route connecting two compute nodes generally uses less bandwidth than a route connecting a compute node to a storage node.

Similarly, the routes used to connect compute nodes used to perform the same task generally require greater bandwidth than those used to connect compute nodes used to perform different tasks.

It is to be recalled here that a task or a process, also called a job, is an application which is defined, in particular, in a time and a place. It is generally executed by a set of nodes after having been launched by a task manager, also called batch manager or resource manager. The purpose of the task manager is in particular to determine the number of nodes necessary for the execution of a task, to check whether there is a sufficient number of nodes available to execute the task, taking into account particular constraints, the case arising, in particular constraints determined by a user, to allocate nodes to the execution of the task and to launch its execution.

The technology is thus directed to the use of the nature and the role of the nodes of a cluster to attribute a weight, or a weighting coefficient, to the routes connecting those nodes at the time of the routing. The assignment of a weight to routes connecting certain types of nodes of a cluster and to nodes having particular roles, in particular to nodes executing the same task, makes it possible to bias the routing algorithm used in relation to certain routes and, consequently, to optimize the allocation of bandwidth to each route in the communication links employed.

In a conventional manner, when the routing algorithm used establishes a route between two nodes and there are several possibilities, it compares the load levels associated with those possibilities, that is to say, typically, the number of routes using the links corresponding to those possibilities, and chooses the one whose load level is the lowest. However, in accordance with the invention, when a route is established between two nodes, the load level of the communication links supporting that route is incremented according to a weight whose value is linked to the types of those two nodes and to the task to which they are allocated.

The assignment of a given weight to certain types of routes makes it possible to bias the routing in favor of certain routes which have specific needs in terms of bandwidth. Thus, by using a weight whose value is high for a route connecting two nodes, it is possible to allocate a higher bandwidth to the communication of data between those nodes.

The assignment of weight to routes during a routing phase may be performed through an application program interface (API).

According to a particular embodiment, the assignment of weight in the routing phase is determined according to the type of the nodes or of the group or groups to which they belong and according to the tasks executed by those nodes, independently.

To assign a weight according to the type of the nodes or of the group or groups to which they belong, a weight file, called weight file, may be used. It makes it possible here to assign weights to routes defined by port identifiers, called port GUIDs (standing for Globally Unique Identifiers) in a communication network of Infiniband type.

Such a file is analyzed before the routing phase. It contains a list of the communicating elements of the communication network, typically nodes, grouped by type, and a list of weights for pairs formed between those groups. At the time of their analysis, those weights may be used for filling an array that describes the load level increment to be used for each communication link during the routing phase. By default, when the value of a weight for a route connecting two types of nodes is not defined, its value is equal to one.

When a route is established through a set of links during the routing phase, the load level associated with each of those links is incremented by the value of the weight linked to the types of nodes between which the route is established.

FIG. 4, comprising FIGS. 4a to 4d, illustrates this principle of routing according to the type of the nodes or of the group or groups to which they belong, in a switch 400, during an initialization phase of a cluster comprising that switch.

Like the switch 300 illustrated in FIG. 3, the switch 400 here has four input communication links, denoted 410-1 to 410-4, linking the switch 400 to inputs 405-1 to 405-4 and two output communication links, denoted 420-1 and 420-2, linking the switch 400 to outputs 415-1 and 415-2. The inputs are, for example, outputs from nodes of the network or outputs of other switches.

Prior to initialization, none of the links 410-1 to 410-4, 420-1 and 420-2 comprises any route. The load level associated with each of those links is thus zero as illustrated in FIG. 4a beside each link. Then, when a route is to be established between the input 405-1 and an output of the switch 400, the link 410-1 (the only one able to be used) is selected as well as the link 420-1 (as the same zero load level is associated with the links 420-1 and 420-2, the first link is selected). It is assumed here that the object of the route using the links 410-1 and 420-1 which has just been established is to connect a compute node to a storage node. Consequently, if the weight value of a route connecting nodes of compute and storage type is 200, that value is used to increment the load level of the links 410-1 and 420-1, as illustrated in FIG. 4b.

In the same way, when a route is to be established between the input 405-2 and an output of the switch 400, the link 40-2 (the only one able to be used) is selected as well as the link 420-2 (as a load level equal to 200 is associated with the link 420-1 and a zero load level is associated with the link 420, the latter, whose load level has the lowest value, is selected).

Again, if it is accepted that the object of the route using the links 410-2 and 420-2 which has just been established is to connect a service node to a compute node and that the weight value of a route connecting nodes of service and compute type is 99, that value is used to increment the load level of the links 410-2 and 420-2, as illustrated in FIG. 4c.

In similar manner, when a route is to be established between the input 405-3 and an output of the switch 400, the link 410-3 (the only one able to be used) is selected as well as the link 420-2 (as a load level equal to 200 is associated with the link 420-1 and a load level equal to 99 is associated with the link 420, the latter, whose load level has the lowest value, is selected). If it is accepted that the object of the route using the links 410-3 and 420-2 which has just been established is to link two compute nodes and that the weight value of a route connecting nodes of compute type is 1, that value is used to increment the load level of the links 410-3 and 420-2, as illustrated in FIG. 4d.

An extract of a weight file is presented in an appendix hereto (extract 1). It illustrates an example of grouping of nodes of a communication network, each group here representing distinct types of nodes, as well as the attribution of weight to node type pairs.

According to this example, the nodes having the values 0x100901, 0x101201, 0x100903, 0x1101203, 0x101207, 0x100909 and 0x101209 as port GUIDs are nodes of "storage" type. The definition of a node type is made here using the indication DEF followed by the name of the group itself followed by the list of the corresponding port GUIDs, placed between curly brackets. Similarly, the nodes having the values 0x100905, 0x101205 and 0x100907 as port GUIDs are nodes of "admin" type, that is to say administration nodes. Similarly, the nodes having the values 0x10090b, 0x010120b, 0x10090d, 0x10120d, 0x10090f, 0x10120f, 0x100911, 0x101211, 0x100913, 0x101213, 0x100915, 0x100917, 0x101217 and 0x100919 as port GUIDs are nodes of "compute" type. Furthermore, a node type called "service" groups together all the nodes of "storage" and "admin" type.

The weights are given here at the end of the file. The syntax to define the weight of a route connecting two nodes here uses the formulation "ID1=>ID2 weight" where ID1 is the port GUID or the originating group of the node, ID2 is the port GUID or the recipient group of the node and weight is the value to be used during the calculation of the load for a link. According to this example, a weight value equal to 200 is added to all the routes going from a compute node, i.e. a node of "compute" type, to a storage node, i.e. a node of "storage" type ("compute=>storage 200"). Similarly, a weight value equal to 99 is added to all the routes going from a service node, i.e. a node of "service" type, to a compute node, i.e. a node of "compute" type ("service=>compute 99"). In the same way, a weight value equal to 200 is added to all the routes going from an administration node, (a node of "admin" type), to a storage node, i.e. a node of "storage" type ("admin=>storage 200").

According to a particular embodiment, if the weight associated with a route linking two types of nodes appears several times in the weight configuration file, the weight associated with that route is equal to the cumulative amount of the specified weights Naturally, other weights may be defined. Similarly, a different syntax may be used. Moreover, if, according to the examples given previously, the routes are considered as being directional, the load level associated with a route may be the same as that associated with the reverse route as if the routes were bidirectional.

Such routing may be made during the initialization of a cluster or be made conjointly with a re-routing operation linked to the execution of a task as described below.

Before launching the execution of a task, a list of the identifiers of the nodes allocated to the execution of that task is sent to a software module for intra-task weight management during a step called task prolog or job prolog. This list is established by the task manager before launching the task.

The intra-task weight management module thus associates a task identifier with the node identifiers belonging to the received list and preferably establishes a match between those node identifiers and information stored in a database, in particular port identifiers or port GUIDs, in order to establish a match between a task identifier and port GUIDs. A weight having a particular value is then assigned to each pair of port GUIDs associated with the same identifier. Thus, at the time of routing, when a route is created via a set of communication links, the load level of those links is incremented by a value equal to that weight.

By way of illustration, if the load level of a communication link used to establish a route between two nodes that are not allocated to the execution of the same task is equal to one, the load level of a similar communication link used to establish a route between two nodes allocated to the execution of the same task may be equal to ten. Thus, according to this example, when a route connecting port GUIDs associated with the same task identifier is created via a set of communication links, the load level of each of those communication links is incremented by ten.

After having assigned weights to pairs of nodes, or to be more precise here, to pairs of port GUIDs, a message may be sent to a network manager, called subnet manager, to re-route the cluster according to the task to execute.

However, advantageously, the re-routing is only carried out under certain conditions in order not to unnecessarily disturb the cluster. Thus, for example, the re-routing may only be carried out if the number of nodes allocated to the task to execute is high compared to the number of nodes of the cluster and/or if the estimated time for execution of the task is greater than a predetermined threshold. Thus, by way of illustration, the re-routing may only be carried out if more than 25% of the cluster nodes have been allocated to the task to execute and if the execution time of that task is greater than one hour.

After the re-routing, the task is launched. Next, after its execution, the values of the weights of the pairs of nodes (or port GUIDs) allocated to the execution of that task are re-initialized to their initial value, for example to the value one. This step is termed epilog.

FIG. 5 illustrates an example of topology for a part of a cluster in which the computation of weights of routes connecting nodes according to executed tasks, in accordance with the invention, enables the routing to be optimized.

The part of the cluster represented here comprises a first switch 500-1 to which are connected four compute nodes referenced 505-1 to 505-4 as well as a second switch 500-2, connected to the first switch 500-1 by two communication links, to which are connected the compute nodes 505-5 to 505-8. The communication links are static communication links, for example Infiniband type communication links.

According to the example represented in FIG. 5, the compute nodes 505-1 to 505-6, forming the set 510-1, are assigned to a first task whereas the compute nodes 505-7 and 505-8, forming the set 510-2, are assigned to a second task.

As indicated earlier, a weight value of a route connecting two nodes is set by default, and may be equal to one. Thus, the load of the communication links 515-1, 515-2 and 515-3, linking the node 505-1 to the switch 500-1, the node 505-8 to the switch 500-2 and linking between the switches, respectively, relative to the route connecting the nodes 505-1 and 505-8 (assuming that route uses the communication link 515-3), is equal to that value by default, for example to one as specified next to the link 515-3 (the load relative to the other routes using the link 515-3 is ignored here in the interest of clarity).

Such a default value may be changed on launching a task.

Thus, further to the allocation of the nodes 505-1 to 505-6 to the first task, the weight of the routes connecting together the nodes 505-1 to 505-6 may be modified. For example, the load of the communication links 515-1, 515-4 and 515-5, linking the node 505-1 to the switch 500-1, the node 505-5 to the switch 500-2 and linking between the switches, respectively, relative to the route connecting the nodes 505-1 and 505-5 (assuming that route uses the communication link 515-5), is equal to that other value, for example to ten as specified next to the link 515-5 (the load relative to the other routes using the link 515-5 is ignored here in the interest of clarity).

According to a particular embodiment, the computation of weight for routes connecting nodes assigned to the same task makes use of several software modules. These modules are in particular directed to a network manager enabling the re-routing and the use of an API enabling weights to be managed, a task manager to establish a list of nodes allocated to the execution of a task, a communication link manager to establish the relationship between the identifier of a node and items of routing information such as port GUIDs and an intra-task weight management module. Some of these modules may be used without particular modification (task manager), others are modified to take into account the weight management (network manager and communication link manager) and others are specific to the weight management (intra-task weight management module).

The activation of the weight management may be performed through the network manager by inserting a command line in a configuration file, for example the line routing_engine <routing engine name>. It may also be performed by selecting an option of a command of the network manager, for example the command –R <routing engine name>.

It is observed here that the weights associated with routes connecting nodes other than compute nodes are not affected by the attribution of weight according to the tasks executed by the nodes due to the fact that those nodes do not appear in the list of the identifiers of the nodes allocated to a task sent by the task manager.

Thus, the management of weight according to the type of the nodes or according to the groups to which they belong and the management of weight according to the tasks executed are complementary and do not mutually disturb each other.

At the time of the routing phase, the routes are, preferably, determined in an ordered manner such that a route associated with a weight of value greater than that of a weight of another route is determined before that other route in order to optimize the routing. This order may be determined on the basis of the weight array and the groups of nodes enabling them to be identified according to their type and on the basis of a weight table determined on launching a task.

Figure 6A:
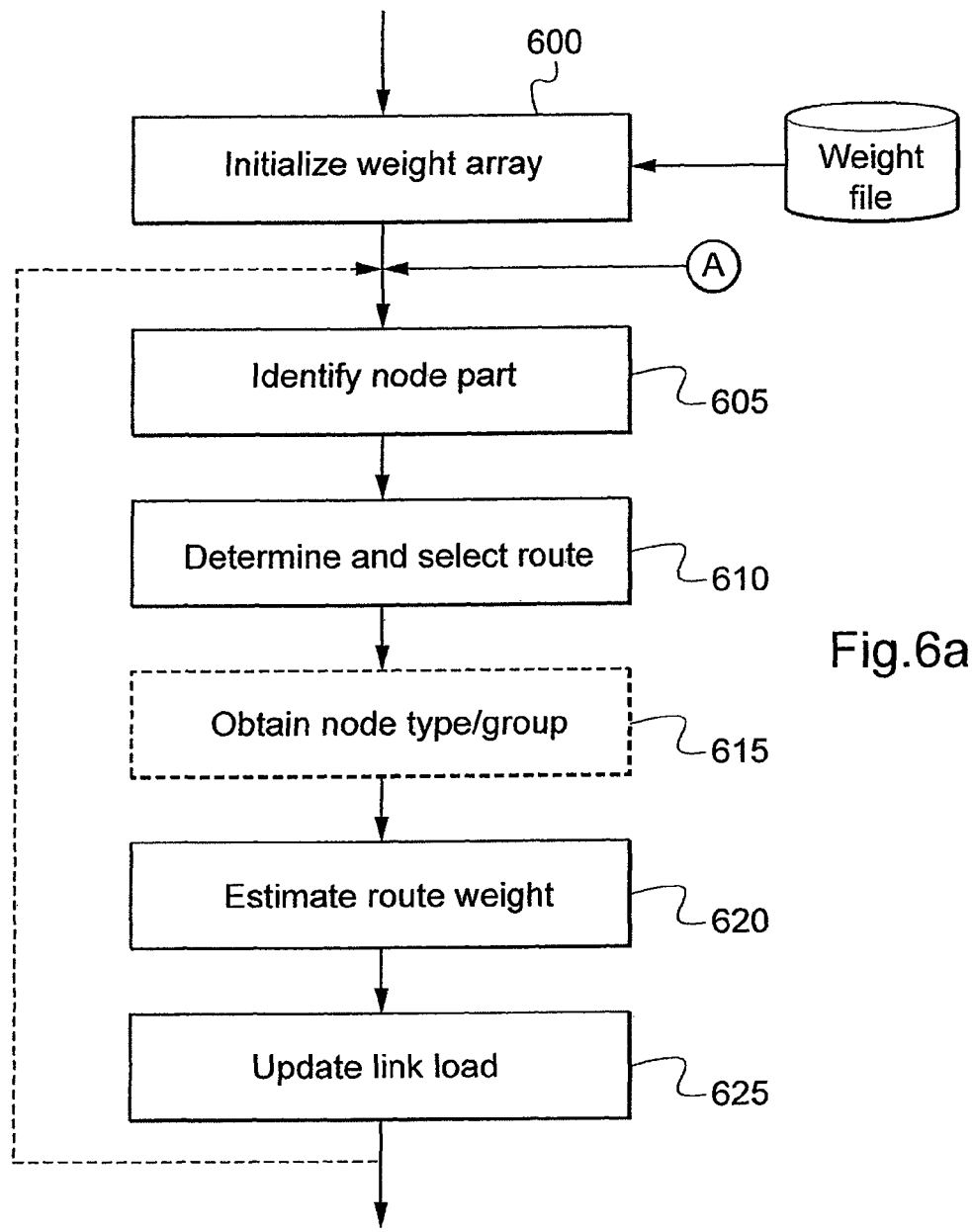
FIGS. 6a and 6b illustrates certain steps of an example algorithm for routing or re-routing a cluster comprising static communication links.
Figure 6B:
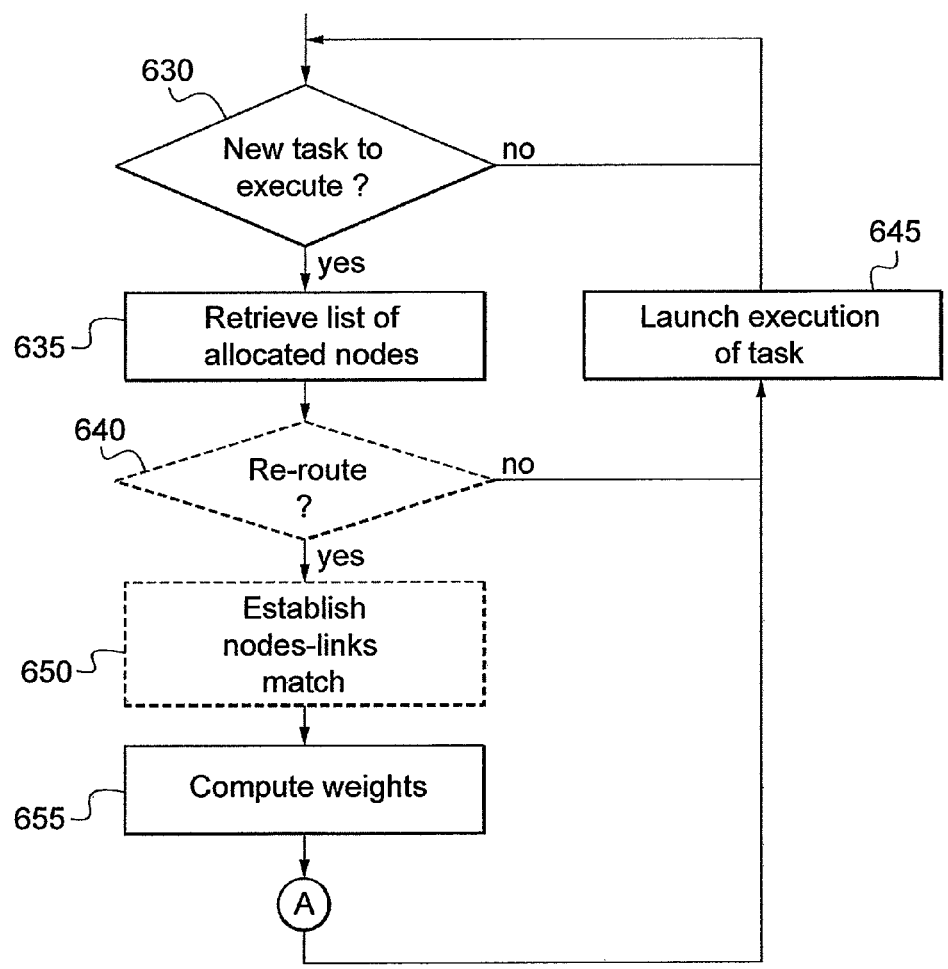

FIG. 6, comprising FIGS. 6a and 6b illustrates certain steps of an example algorithm for routing or re-routing a cluster comprising static communication links.

FIG. 6a is a diagrammatic illustration of an example of an algorithm implemented to determine and select a route connecting two nodes as well as to determine the load level of a communication link after selecting a route.

A first step (step 600) is directed to the initialization of a weight array enabling a weight to be associated with a pair of nodes formed from two nodes (the same weight whatever the direction of the route) or from an originating node and a recipient node (weight linked to the direction of a route) as illustrated in the appendix (table 1). This array may in particular be established from a weight file such as the one presented in the appendix (extract 1). This step also makes it possible to store the matches between an identifier of a node and its type and/or one or more groups to which it belongs. Alternatively, the weight array may directly establish the weights associated with each pair of nodes as partially illustrated in the appendix (table 2).

Table 1 indicates the weight to be attributed to a route connecting a source node type to a recipient node type whereas table 2 indicates the weight to be attributed to a route connecting a source node to a recipient node.

In a following step (step 605), a pair of nodes between which a route is to be established is identified. The pair of nodes here comprises a source node and a recipient node. This step is a basic step of the routing algorithms to enable definition of the routes to be established. The nodes are, for example, identified according to port GUIDs.

The steps of determining possible routes to connect those identified nodes and of selecting the best route are then carried out (step 610) according to a standard algorithm, for example according to the FTree algorithm.

In a following step (step 615), the type of the identified nodes or the group or groups to which they belong are obtained according to the information obtained during the initialization step. As suggested by the use of dashed line, this step is optional since if, in particular, the weight array determined during the initialization phase directly associates weights with the identifiers of the nodes, it is not necessary, at this stage, to determine the type thereof and/or to determine the group or groups to which they belong.

The weight of the route connecting these two nodes is then estimated (step 620). This estimation is based on the types of the nodes, the group or groups to which they belong and/or their identifier, for example their port GUID, or based on results of computation carried out previously if the two identified nodes are compute nodes allocated to the execution of the same task.

When the weight is linked to the type of the identified nodes or to one or more groups to which they belong, it is preferably given directly by reading the weight array determined beforehand. Alternatively, a weight may be estimated according to a reference stored in the weight array according to a predetermined function or table. The weights coming from the weight array may also be increased or reduced according to particular circumstances linked, for example, to the topology of the cluster and to the position of the links implemented by the route considered.

When the weight is linked to the task performed by the identified nodes, it is obtained via a weight table such as that presented in the appendix (Table 3).

As indicated earlier, if the weight value of a route is not equal to a default value, it is equal to a value determined according to a node type or group membership or according to an allocation according to a task but it is not, preferably, equal to a value determined according to a node type or group membership and according to an allocation according to a task. Consequently, if that value is determined on the basis of the weight array used, it is not always necessary to verify whether the weight must be modified according to the allocation of the identified nodes.

Table 3 here comprises three columns respectively corresponding to a source port GUID, a recipient port GUID and a weight value. Each row corresponds to a route between the node comprising the source port GUID and the node comprising the recipient port GUID.

The weight estimated for the selected route is then used to update the load level associated with the communication links employed by the route considered (step 625). As described earlier, the value of the estimated weight may be added to the load level of the communication links employed by the route considered.

As suggested by the arrow in dashed line, steps 605 to 625 may be repeated to establish new routes. Typically, steps 605 to 625 are repeated for all the routes to be established in the cluster in which the algorithm illustrated in FIG. 6*a* is implemented.

FIG. 6*b* illustrates certain steps of an example algorithm for weight computation of routes connecting two nodes when those nodes are allocated to the execution of the same task.

As indicated earlier, when a new task is to be launched, the task manager determines whether it may be executed, and, in the affirmative, establishes the list of the nodes allocated to the execution thereof. Thus, when a new task is to be executed (step 630), the intra-task weight management module receives the list of the nodes allocated to its execution (step 635). A task identifier is associated with those node identifiers.

If no new task is to be executed, the algorithm loops on itself until it is made to stop.

A test is then carried out (step 640) to determine whether re-routing of a cluster should be carried out to optimize, in particular, the execution of the task to be executed.

As indicated earlier, such a test may in particular consist of comparing the number of nodes allocated to the task to execute with the number of nodes of the cluster and/or of comparing the estimated execution time for the task with a predetermined threshold.

As suggested by the use of dashed line, this step is optional. It may be decided that re-routing should be carried out for each task executed.

If it is not necessary to perform re-routing, an instruction is sent to the task manager to enable the execution of the task considered (step 645). The algorithm then returns to step 630 to await a new task to perform.

Otherwise, if re-routing must be carried out, a following step (step 650) is directed to establishing a link between node identifiers and items of routing information such as port GUIDs. This step is typically carried out on the basis of the list of node identifiers received from the task manager and on the basis of configuration data generally stored in a database. This step makes it possible in particular to identify source and recipient addresses of nodes allocated to the execution of the same task and between which routes must be established.

Again, as suggested by the use of dashed line, this step is optional. Its implementation depends on the manner in which the communication links are managed between the nodes in the cluster.

Lastly, a weight is attributed to each route connecting an output address of a node allocated to the task to be executed with an input address of a node allocated to that same task. Such addresses are, preferably, port GUIDs. This step makes it possible to establish a weight table such as that illustrated in the appendix (Table 3).

The cluster is then re-routed using an algorithm such as that described with reference to FIG. 6*a* (reference A). An instruction is next sent to the task manager to enable the execution of the task considered (step 645) and the algorithm returns to step 630 to await a new task to perform.

Figure 2:
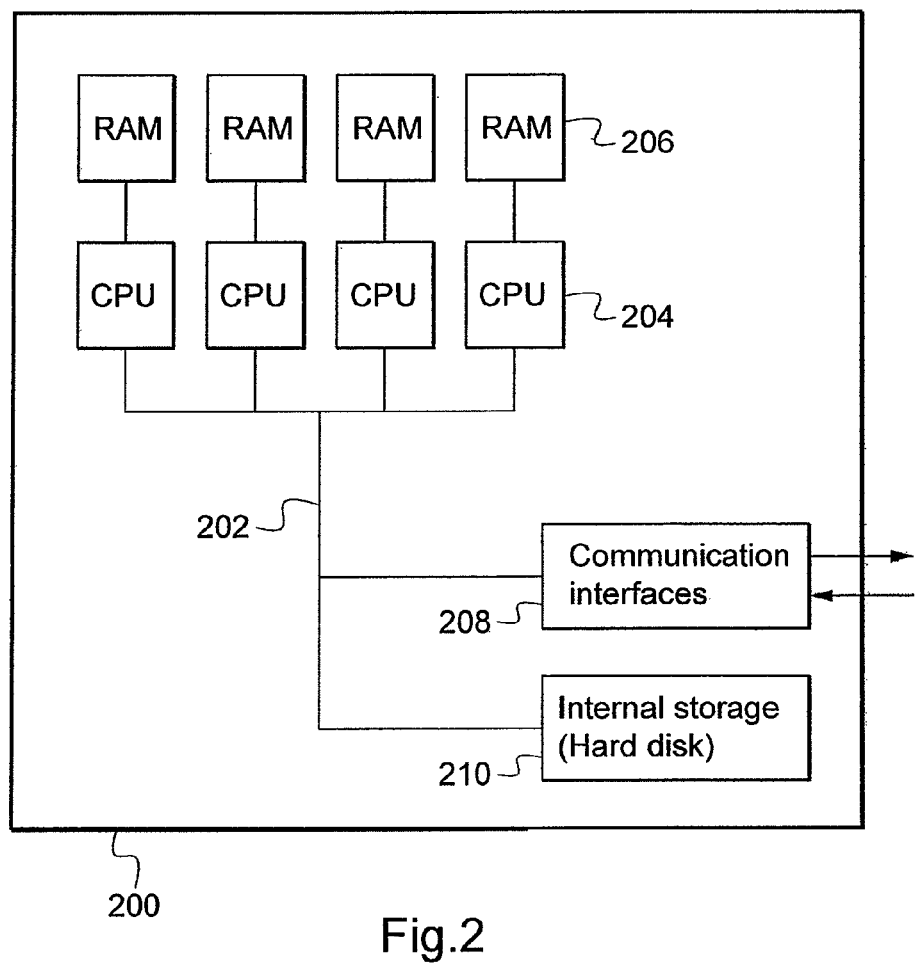
FIG. 2 illustrates an example of architecture for a node of a cluster.
Figure 3A:
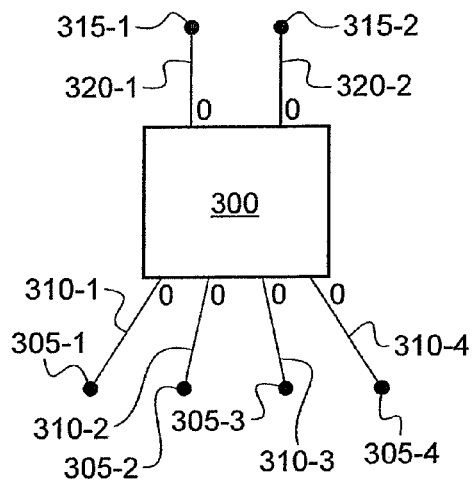
FIGS. 3a to 3e, illustrates the routing principle, according to an FTree type algorithm, in a switch at the time of an initialization phase of a cluster comprising that switch.
Figure 3B:
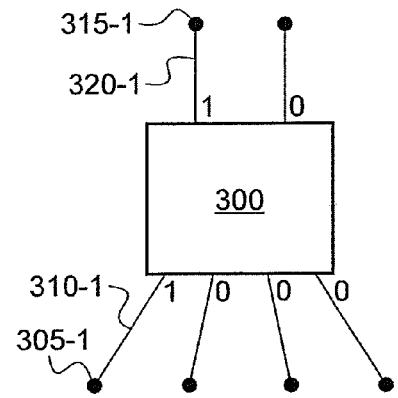
Figure 3C:
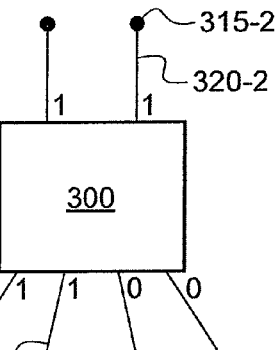
Figure 3D:
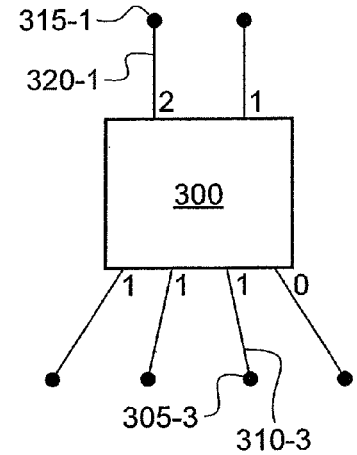
Figure 3E:
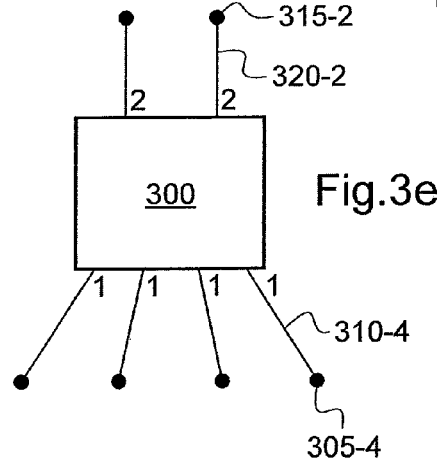

It is observed that the algorithm described with reference to FIG. 6 may, for example, be implemented in a device whose architecture is similar to that described with reference to FIG. 2.

This algorithm is implemented in the network manager running on an administration node.

Furthermore, it is observed that the use of weight in a routing algorithm is compatible with a quality of service (QoS) management algorithm. It is to be recalled here that quality of service management, typically based on levels of service and credits associated with each route according to a virtual link concept, makes it possible to favor certain routes in case of contention of the network. This management is thus independent of the routing in itself. These two approaches are thus complementary to improve the transmission of data in a cluster and thus improve the performance of the latter.

While the above embodiments have been described with reference to the accompanying drawings, it is to be understood that the present disclosure is not limited to the disclosed embodiments, but, on the contrary, is intended to cover various modifications and equivalent arrangements included within the spirit and scope of the appended claims.

APPENDIX

```
DEF storage {
0x100901
0x101201
0x100903
0x1101203
0x101207
0x100909
0x101209
}
DEF admin {
0x100905
0x101205
0x100907
}
DEF service {
storage
admin
}
DEF compute {
0x10090b
0x10120b
0x10090d
0x10120d
0x10090f
0x10120f
0x100911
0x101211
0x100913
0x101213
0x100915
0x100917
0x101217
0x100919
}
compute => storage 200
service => compute 99
admin => storage 200
```

Extract 1

TABLE 1

| source | rec. | | | |
|---|---|---|---|---|
| | storage | admin | service | compute |
| storage | 1 | 1 | 1 | 99 |
| admin | 200 | 1 | 1 | 99 |
| service | 1 | 1 | 1 | 99 |
| compute | 200 | 1 | 1 | 1 |

TABLE 2

| source | rec. | | | | |
|---|---|---|---|---|---|
| | 0x100901 | 0x101201 | 0x100903 | ... | 0x100919 |
| 0x100901 | — | 200 | 200 | ... | 1 |
| 0x101201 | 200 | — | | ... | 1 |
| 0x100903 | 200 | 200 | — | ... | 1 |
| ... | ... | ... | ... | — | ... |
| 0x100919 | 200 | 200 | 200 | ... | — |

TABLE 3

| Source address | Recipient address | Weight |
|---|---|---|
| 0x10090b | 0x100911 | 10 |
| 0x10120b | 0x10090d | 10 |
| 0x10090d | 0x10120b | 10 |
| ... | ... | ... |
| 0x100911 | 0x10120b | 10 |

The invention claimed is:

1. A computerized method for pseudo-dynamic routing in a cluster comprising a plurality of nodes, static communication links linking nodes of the plurality of nodes, the routing being based on load levels associated with the communication links, the method comprising:
    receiving a list of node identifiers of the plurality of nodes, the identifiers designating a set of nodes allocated to the execution of a same task;
    assigning a weight having a first predetermined value to a pair formed by an identifier of a first node of the set of nodes and by an identifier of a second node of the set of nodes, the first and second nodes being distinct, a weight having a second predetermined value, distinct from the first value, being assigned by default to the pairs formed of identifiers of nodes allocated to different tasks;
    routing the cluster, the routing comprising selecting a route between the first and second nodes and incrementing by the first value a load level associated with each communication link comprising the selected route, and
    comparing an item of information characteristic of the task with a predetermined item of data, the routing being executed in response to the comparing.

2. The method according to claim 1, further comprising establishing a match between the identifier of the first node and an output address of the first node and between the identifier of the second node and an input address of the second node, the assigning a weight being directed to assigning a weight to a pair formed of the output address of the first node and the input address of the second node.

3. The method according to claim 1, wherein the item of information characteristic of the task is the number of nodes allocated to the execution of the task.

4. The method according to claim 1, further comprising:
    identifying at least two nodes of the cluster, a connection having to be established between the at least two identified nodes;
    determining at least one route connecting the at least two identified nodes according to the communication links, the at least one route being determined according to the at least two identified nodes, a plurality of communication links of the communication links and at least one load level associated with each communication link of the plurality of communication links, and selecting a determined route;
    estimating a weight value associated with the selected route; and
    incrementing a load level associated with each communication link comprising the selected route according to the estimated weight.

5. The method according claim 4, further comprising obtaining a type of node for at least one of the at least two identified nodes, the estimated value of the weight being at least partially estimated according to the obtained type of node.

6. The method according to claim 4, further comprising obtaining a reference of a group to which belongs at least one of the at least two identified nodes, the estimated value of the weight being at least partially estimated according to the group reference obtained.

7. The method according to claim 1, wherein routes are selected in order of the value of the weight associated with them.

8. A computerized method for pseudo-dynamic routing in a cluster comprising a plurality of nodes, static communication links linking nodes of the plurality of nodes, the routing being based on load levels associated with the communication links, the method comprising:
    receiving a list of node identifiers of the plurality of nodes, the identifiers designating a set of nodes allocated to the execution of a same task;
    assigning a weight having a first predetermined value to a pair formed by an identifier of a first node of the set of nodes and by an identifier of a second node of the set of nodes, the first and second nodes being distinct, a weight having a second predetermined value, distinct from the first value, being assigned by default to the pairs formed of identifiers of nodes allocated to different tasks;
    routing the cluster, the routing comprising selecting a route between the first and second nodes and incrementing by the first value a load level associated with each communication link comprising the selected route, and
    updating at least one static routing table, the at least one static routing table being associated with at least one switch of the cluster, the at least one switch linking at least two nodes of the cluster.

9. A non-transitory computer readable medium comprising instructions that when executed by a processor perform the method of:
    receiving a list of node identifiers of the plurality of nodes, the identifiers designating a set of nodes allocated to the execution of a same task;
    assigning a weight having a first predetermined value to a pair formed by an identifier of a first node of the set of nodes and by an identifier of a second node of the set of nodes, the first and second nodes being distinct, a weight having a second predetermined value, distinct from the first value, being assigned by default to the pairs formed of identifiers of nodes allocated to different tasks;

routing the cluster, the routing comprising selecting a route between the first and second nodes and incrementing by the first value a load level associated with each communication link comprising the selected route, and comparing an item of information characteristic of the task with a predetermined item of data, the routing being executed in response to the comparing.

10. A computer system for pseudo-dynamic routing in a cluster comprising a plurality of nodes, static communication links linking nodes of the plurality of nodes, the routing being based on load levels associated with the communication links having software that is programmed to:

receive a list of node identifiers of the plurality of nodes, the identifiers designating a set of nodes allocated to the execution of a same task;

assign a weight having a first predetermined value to a pair formed by an identifier of a first node of the set of nodes and by an identifier of a second node of the set of nodes, the first and second nodes being distinct, a weight having a second predetermined value, distinct from the first value, being assigned by default to the pairs formed of identifiers of nodes allocated to different tasks;

route the cluster, the routing comprising selecting a route between the first and second nodes and incrementing by the first value a load level associated with each communication link comprising the selected route, and compare an item of information characteristic of the task with a predetermined item of data, the routing being executed in response to the comparing.

\* \* \* \* \*